(12) United States Patent
Kruse et al.

(10) Patent No.: US 7,487,866 B2
(45) Date of Patent: Feb. 10, 2009

(54) HYDRAULIC CIRCUIT FOR A TRANSMISSION OF A MOTOR VEHICLE

(75) Inventors: Georg Kruse, Gifhorn (DE); Rainer Hofmann, Helmstedt (DE); Carsten Adomeit, Hannover (DE); Lloyd Storey, Moreton Morrell (GB); Shaun Mepham, Saline, MI (US)

(73) Assignee: Volkswagen AG, Wolfsburg (DE)

( * ) Notice: Subject to any disclaimer, the term of this patent is extended or adjusted under 35 U.S.C. 154(b) by 396 days.

(21) Appl. No.: 11/476,285

(22) Filed: Jun. 28, 2006

(65) Prior Publication Data
US 2007/0020119 A1 Jan. 25, 2007

(30) Foreign Application Priority Data
Jun. 28, 2005 (DE) .................. 10 2005 029 964

(51) Int. Cl.
F16D 13/72 (2006.01)
F16D 21/00 (2006.01)

(52) U.S. Cl. .............. 192/113.3; 192/48.8; 192/70.12

(58) Field of Classification Search ............ None
See application file for complete search history.

(56) References Cited

U.S. PATENT DOCUMENTS 6,361,287 B1 3/2002 Hopper
6,631,651 B2 * 10/2003 Petrzik ................. 74/346
6,715,597 B1 * 4/2004 Buchanan et al. ....... 192/70.12

FOREIGN PATENT DOCUMENTS

| DE | 198 57 222 A1 | 6/2000 |
| DE | 101 47 123 A1 | 4/2002 |
| DE | 103 27 406 A1 | 2/2005 |

* cited by examiner

Primary Examiner—Richard M. Lorence

(57) ABSTRACT

A hydraulic circuit for a motor vehicle transmission, preferably a twin-clutch transmission, is connected for cooling at least one clutch of the transmission. The hydraulic circuit is preferably a low-pressure circuit and it includes at least one hydraulic pump, at least one filter element, for filtering the hydraulic oil, and at least one pressure-regulating valve. The circuit-related control sequence and the power consumption of the hydraulic pump are optimized in that at least one adjusting valve is provided in order to control the volume flow of cooling oil flowing to the clutch, in that a pressure-compensation valve is provided in addition, and in that the pressure-regulating valve, the adjusting valve and/or the pressure-compensation valve are arranged and/or formed within the hydraulic circuit such that the pressure difference between the supply pressure and the establishing cooling-oil pressure is essentially constant.

16 Claims, 2 Drawing Sheets

HYDRAULIC CIRCUIT FOR A TRANSMISSION OF A MOTOR VEHICLE

BACKGROUND OF THE INVENTION

Field of the Invention

The invention relates to a hydraulic circuit for a transmission of a motor vehicle, preferably for a twin-clutch transmission. It is thereby possible for the hydraulic circuit, which is preferably designed as a low-pressure circuit, to realize the cooling of at least one clutch of the transmission. There are also provided at least one hydraulic pump, at least one filter element for filtering the hydraulic oil, and at least one pressure-regulating valve.

Various designs of hydraulic circuits for transmissions of motor vehicles are known from the prior art. For example, U.S. Pat. No. 6,361,287 B1 and its counterpart German patent application DE 101 47 123 A1 disclose a hydraulic circuit with a hydraulic pump and a suction filter and with a pressure regulator and other control components.

German published patent application DE 103 27 406 A1 discloses a hydraulic circuit which is divided into a high-pressure circuit and a low-pressure circuit. A hydraulic pump and a suction filter are likewise provided here in order to supply the low-pressure circuit. German published patent application DE 198 57 222 A1 discloses similar control components in the hydraulic circuit for a transmission.

The hydraulic circuits which are known from the prior art essentially have in common the fact that the hydraulic pump provided has to have a relatively high capacity in order to ensure the functional sequences which are realized correspondingly by the hydraulic circuit. These sequences include, for example, in particular the cooling of a clutch of the transmission, since the clutch, in dependence on the respective driving state of the motor vehicle, always has to be optimally cooled in order for, in particular, the disks or other elements of the clutch not to be damaged. For this purpose, it is generally always necessary to have a correspondingly high volume flow of cooling oil, which preferably also always has to be under a certain pressure in order to ensure a corresponding volume flow of oil into the corresponding components of the clutch.

In particular since a sufficient volume flow of cooling oil always has to be provided in order to cool the clutch, this increases the power consumption of the hydraulic pump in the case of the hydraulic circuits which are known from the prior art. The design here is thus not yet optimal.

SUMMARY OF THE INVENTION

It is accordingly an object of the invention to provide a novel hydraulic circuit for a motor vehicle transmission which overcomes the above-mentioned disadvantages of the heretofore-known devices and methods of this general type and which is configured such that the power consumption of the hydraulic pump is reduced, in particular the control outlay required for clutch cooling, the circuit-related outlay, and the associated maintenance outlay are reduced.

With the foregoing and other objects in view there is provided, in accordance with the invention, a hydraulic circuit for cooling at least one clutch of a transmission of a motor vehicle. The hydraulic circuit comprises:
  at least one hydraulic pump;
  at least one filter element for filtering hydraulic oil communicating with the at least one hydraulic pump;
  at least one pressure-regulating valve communicating with the hydraulic pump;
  at least one adjusting valve disposed to control a volume flow of cooling oil flowing to the clutch; and
  a pressure-compensation valve;
  wherein at least one of the pressure-regulating valve, the adjusting valve, and the pressure-compensation valve are configured within the hydraulic circuit to maintain a substantially constant pressure difference between a supply pressure and a resulting cooling-oil pressure.

In other words, the above objects are achieved in that at least one adjusting valve is provided in order to control the volume flow of cooling oil flowing to the clutch, in that a pressure-compensation valve is provided in addition, and in that the pressure-regulating valve, the adjusting valve and/or the pressure-compensation valve are arranged and/or formed within the hydraulic circuit such that the pressure difference between the supply pressure and the establishing cooling-oil pressure is essentially constant. By virtue of the circuit-related components provided here, in particular since the pressure difference between the supply pressure and the establishing cooling-oil pressure is now essentially constant, the previously customary power consumption of the hydraulic pump is essentially reduced. The effect of the pressure difference essentially remaining the same between the establishing cooling-oil pressure and the supply pressure is utilized for straight forward activation and/or a straight forward circuit-related control sequence, as a result of which the power consumption of the hydraulic pump is optimized and, in addition, the entire control sequence is significantly simplified. In particular, this means that there is no need for any additional complicated and very costly circuit-related components, which may be explained hereinbelow. As a result, the disadvantages mentioned in the introduction are avoided.

The invention is particularly suitable for double-clutch transmissions and the hydraulic circuit is preferably a low-pressure circuit In accordance with an added feature of the invention, the adjusting valve is configured to meter a volume flow of cooling oil, and the adjusting valve is formed with an orifice plate or baffle plate.

In accordance with an additional feature of the invention, the adjusting valve is configured as a slotted slide.

In accordance with another feature of the invention, the filter element is a pressure filter disposed downstream of the hydraulic pump in a fluid flow direction.

In accordance with a further feature of the invention, the pressure-regulating valve is connected downstream (in a fluid flow direction) of the pressure filter, and the pressure-regulating valve is fluidically connected, directly or indirectly, to a first inlet of the adjusting valve.

In accordance with a preferred implementation, the hydraulic circuit has additional components, including further pressure valves and/or control valves.

In accordance with again an added feature of the invention, the adjusting valve has a first outlet fluidically connected (i.e., flow-connected) to the clutch to be cooled. Preferably, the first outlet of the adjusting valve is additionally flow-connected to the pressure-compensation valve.

In accordance with again an additional feature of the invention, the pressure-compensation valve is fluidically connected to an outlet line and to the pressure-regulating valve via a further pressure line. Preferably, the pressure line is flow-connected to a second inlet of the adjusting valve in a preferred implementation, there is provided an oil cooler connected in the pressure line.

In accordance with again another feature of the invention, there are provided two adjusting valves for two clutches of a twin-clutch transmission. In a further development, there is provided a maximum former connected between the adjusting valves and the pressure-compensation valve.

In accordance with a concomitant feature of the invention, the adjusting valve is formed with a slotted slide having at least one specifically configured piston element arranged for displacement in relation to a spring force.

Other features which are considered as characteristic for the invention are set forth in the appended claims.

Although the invention is illustrated and described herein as embodied in a hydraulic circuit for a transmission of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
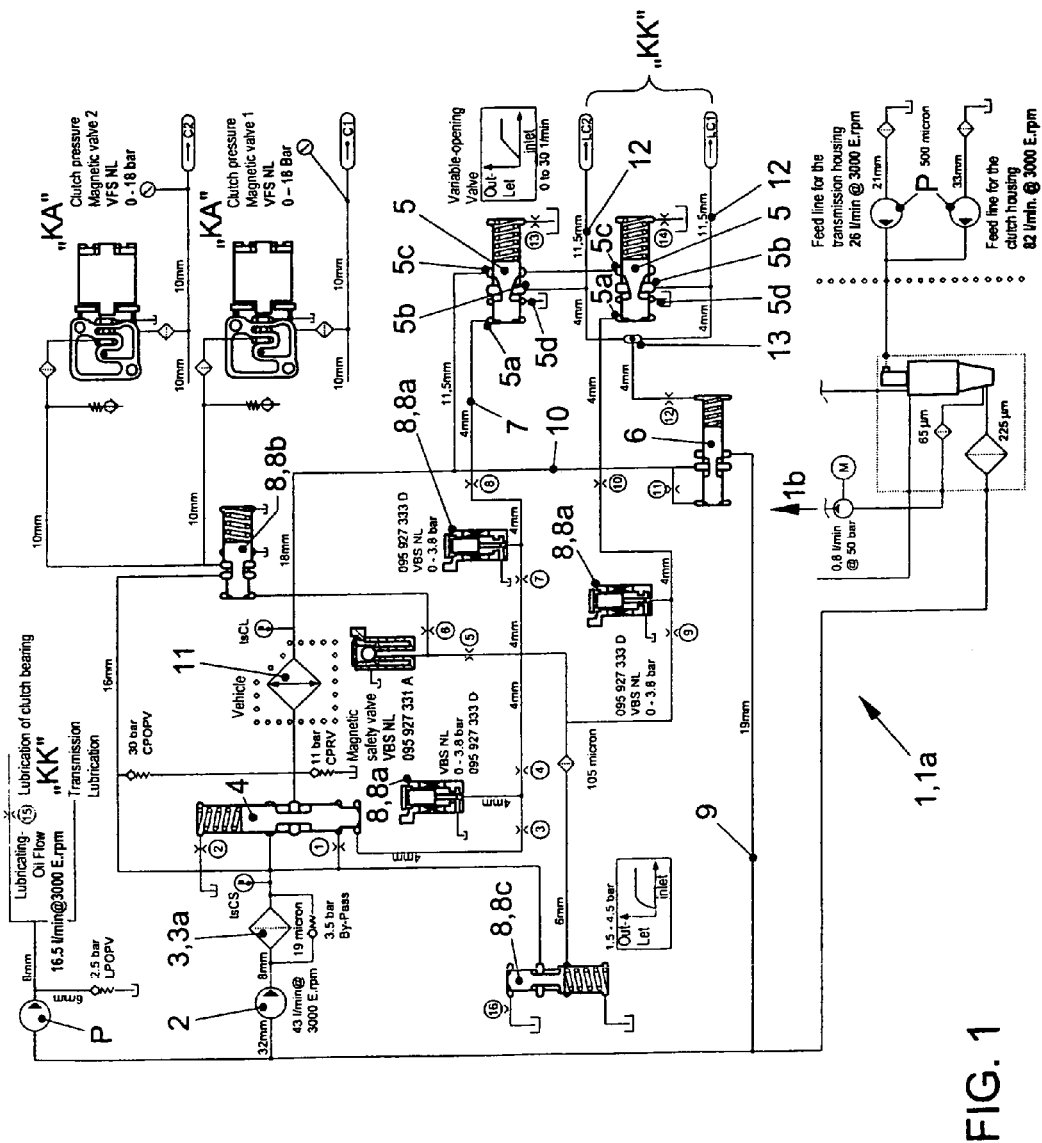
FIG. 1 is a schematic, simplified illustration of the hydraulic diagram of part of the hydraulic circuit.

Referring now to the figures of the drawing in detail and first, particularly, to FIG. 1 thereof, there is shown a hydraulic circuit 1 for a transmission of a motor vehicle, preferably for a twin-clutch transmission of a motor vehicle. The hydraulic circuit 1, part of which is illustrated here, is preferably configured as a low-pressure circuit 1a. However, it is also possible to provide, in addition, a high-pressure circuit 1b, as indicated in the figure.

The hydraulic circuit 1 or 1a designed in this way preferably ensures the lubrication of individual components of the transmission, in particular it ensures clutch cooling KK and the lubrication SK of individual components of the transmission as well as clutch contact pressure KA.

The hydraulic circuit 1 illustrated here, or the hydraulic circuit 1 which is designed as a low-pressure circuit 1a here, preferably forms part of a larger hydraulic circuit, which preferably also has a high-pressure circuit 1b. However, this need not necessarily be the case; the hydraulic circuit 1 may also be designed in its own right just as a low-pressure circuit 1a.

Pressures of approximately 5 to 20 bar (0.5-2 MPa) are realized in the hydraulic circuit 1 or low-pressure circuit 1a. The hydraulic circuit 1 or 1a. supplies, in the first instance, consuming units which require substantially large volumes of oil, in particular, with a combustion engine running, via directly driven pumps P, preferably hydraulic pumps; this ensures the corresponding flow of oil and/or the realization of the oil pressure. These consuming units of the low-pressure circuit 1a include, in particular, those for clutch cooling, already referred to here by the abbreviation "KK", for lubrication (referred to here by the abbreviation "SK") of possible transmission parts and also for clutch actuation and/or clutch contact pressure, already referred to here, in general, by the abbreviation "KA". This is illustrated correspondingly in FIG. 1.

FIG. 1 shows a hydraulic pump 2, a filter element 3, for filtering the hydraulic oil, and a pressure-regulating valve 4.

The disadvantages described in the introduction, then, are avoided in that at least one adjusting valve 5 is provided in order to control the volume flow of cooling oil flowing to the clutch, in that a pressure-compensation valve 6 is provided in addition, and in that the pressure-regulating valve 4, the adjusting valve 5 and/or the pressure-compensation valve 6 are arranged and/or formed within the hydraulic circuit 1 such that the pressure difference between the supply pressure Pv and the establishing cooling-oil pressure Pk is essentially constant. As a result of the circuit-related combination of the abovementioned features, the volume flow of cooling oil is capable of being metered, so that, in the first instance, the power consumption of the hydraulic pump 2 is thus likewise optimized. The cooling-oil volume flow of the hydraulic medium can thus preferably be metered to the clutch (not illustrated specifically here). As a result, the disadvantages mentioned in the introduction are thus avoided. Particular advantages are achieved, and these may now be explained in detail.

The volume flow of cooling oil, then, can be metered via a kind of orifice plate, which is essentially formed by the adjusting valve 5. The adjusting valve 5 here is preferably designed as a slotted slide, which is clearly illustrated in FIG. 2.

The filter element 3 here is designed as a pressure filter 3a and is arranged downstream of the hydraulic pump 2. The pressure-regulating valve 4 is arranged downstream of the pressure filter 3a and is flow-connected directly or indirectly, in this case via a pressure-medium line 7, to a first inlet 5a of the adjusting valve 5.

As FIG. 1 shows, the hydraulic circuit 1 has additional components, namely further pressure and/or control valves 8, preferably control valves 8a, a safety valve 8b and a constant-pressure valve 8c. It is also possible to provide further pumps P, in particular for lubricating further transmission parts, as well as other components, that is to say filter elements, cyclones (not indicated specifically) or the like.

The adjusting valve 5, then, has a first outlet 5b, which is flow-connected to the clutch which is to be cooled or to the components thereof.

The first outlet 5b of the adjusting valve 5 is additionally flow-connected to the pressure-compensation valve 6. The pressure-compensation valve 6, in turn, is additionally flow-connected, on the one hand, to an outlet line 9 and, on the other hand, to the pressure-regulating valve 4, via a further pressure line 10. The pressure line 10, in turn, is flow-connected to a second inlet 5c of the adjusting valve 5, as is illustrated. An oil cooler 11 is provided within the pressure line 10 and can preferably cool the hydraulic medium, that is to say the hydraulic oil, to the corresponding temperature.

As FIG. 1 shows, then, the supply pressure Pv is applied via the pressure-medium line 7, which is flow-connected to the pressure-regulating valve 4, at the first inlet 5a of the adjusting valve 5. The clutch (not illustrated here) is cooled here via the branches (illustrated schematically) on the pressure-medium lines 12, in this case to the first clutch "LC1" and to the second clutch "LC2". Since the transmission is preferably configured as a twin-clutch transmission and two clutches, that is to say two clutch-cooling units "LC1" and "LC2" have to be realized here, two adjusting valves 5 are also preferably provided here, and are correspondingly configured in each case as slotted slides. A maximum former 13 is provided between the adjusting valves 5 and the pressure-compensation valve 6 and ensures that the greater of the two pressures prevailing at the first outlet 5b of the two adjusting valves 5 is passed on to the pressure-compensation valve 6.

Figure 2:
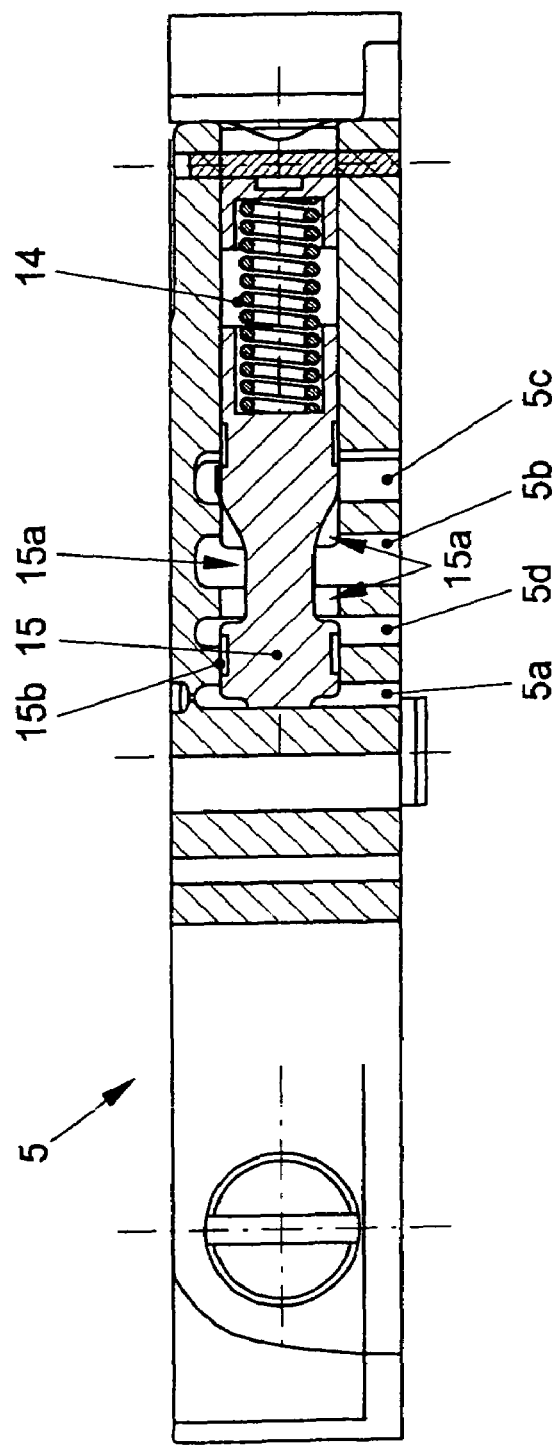
FIG. 2 is a schematic illustration, in section, of the adjusting valve configured as a slotted slide.

As FIG. 2 shows, the adjusting valve 5, then, is preferably designed as a slotted slide and has a specifically designed piston element 15 which is arranged such that it can be displaced in relation to a spring force of a spring element 14, as is clearly illustrated in FIG. 2.

Likewise clearly illustrated in FIG. 2 are the corresponding pressure-medium lines or preferably, in this case, just the inlets and outlets of the adjusting valve 5, namely the first inlet 5a, which is connected to the pressure-medium line 7 and can be subjected to supply pressure Pv, the first outlet 5b, which is connected to the respective pressure-medium lines 12, in order to realize the clutch cooling KK or LC1 and LC2, and the second inlet 5c, which is flow-connected to the pressure line 10, and in this case, finally, the second outlet 5d, which is preferably connected directly to the oilpan or to the tank via a relief channel.

The functioning of the hydraulic diagram illustrated in FIG. 1 and of the adjusting valve 5 illustrated in FIG. 2 will be described in more detail hereinbelow.

Via the hydraulic pump 2, then, oil is correspondingly fed from the tank or oilpan and reaches the pressure-regulating valve 4 by way of the pressure filter 3a. Via the pressure-regulating valve 4, a certain supply pressure Pv is then channeled, via the pressure-medium line 7, to the adjusting valve 5 or the adjusting valves 5, which in this case are preferably connected in parallel. Via the first inlet 5a, it can also clearly be seen in FIG. 2, the left-hand side of the piston element 15 is thus subjected to supply pressure Pv. The clutch-cooling means or the volume flow of cooling oil can be discharged, via the adjusting valve 5, through the first outlet 5b. The piston element 15 has a corresponding, specifically designed aperture 15a and preferably, in addition, specifically designed slots 15b. A certain cooling-oil pressure Pk prevails in the pressure-medium line 12 and/or in the first outlet 5b. Via the pressure line 10, then, a kind of "control pressure Ps" likewise prevails at the second inlet 5c of the adjusting valve 5. As a result of the circuit-related arrangement, then, the pressure difference between the supply pressure Pv and the establishing cooling-oil pressure Pk is preferably constant. Thus, if the cooling-oil pressure Pk drops, then the supply pressure Pv rises—in relative terms—so that the piston element 15 is displaced from left to right, counter to the spring force of the spring element 14, out of the position illustrated in FIG. 2. In this case, the aperture 15a then passes over the second inlet 5c of the adjusting valve 5, so that the inlet is released and, on the one hand, the control pressure Ps can act on the corresponding left-hand surface of the aperture 15a of the piston element 15; on the other, a flow connection is realized between the second inlet 5c and the first outlet 5b, so that it is correspondingly possible to realize the corresponding clutch, i.e. the corresponding clutch cooling LC1, LC2.

By virtue of the system illustrated here, the control components are thus significantly simplified, and the otherwise customary, complex control units which are known from the prior art are also done away with. Immediate adjustment of the volume flow of cooling oil is achieved particularly straightforwardly, so that the end effect is of the power consumption of the hydraulic pump 2 being optimized.

In particular also on account of the adjusting valve 5 being configured as a slotted slide, the pressure difference is kept correspondingly constant via this, as it were, adjustable orifice plate, that is to say via the corresponding surfaces of the slide. In circuit-related terms, this is likewise assisted and/or achieved by the maximum former 3 and the pressure compensation valve 6, as described above.

A further advantage of the low-pressure circuit 1a illustrated here is that the hydraulic pump 2, the pressure filter 3a and the pressure-regulating valve 4, which may also be referred to as the main pressure-regulating valve, are, as it were, switched three ways. The separately provided pressure filter 3a correspondingly filters all the oil for the low-pressure circuit 1a, that is to say not just the oil which is required for the clutch cooling, but also the oil which is required for the clutch contact pressure KA; however, the oil cooler 11 cools just the oil which is required for the clutch cooling, but not the oil for the contact pressure KA of the clutch disks.

Furthermore, it is particularly advantageous, in the case of the arrangement of the hydraulic diagram or low-pressure circuit 1a which is provided here, for it to be possible here for the oil cooler 11 to be spaced apart separately from the individual pressure-regulating valves 4 and adjusting valves 5. The pressure filter 3a is preferably arranged such that it is directly accessible from the floor of the vehicle. It is preferably possible here to remove a cover from the transmission housing, so that the corresponding pressure filter 3a can then be exchanged without any difficulty, which, in turn, reduces the maintenance outlay and the associated costs. As a result, the disadvantages described in the introduction are avoided, and corresponding advantages are achieved, by the low-pressure circuit 1a realized here.

This application claims the priority, under 35 U.S.C. § 119, of German patent application DE 10 2005 029 964.4, filed Jun. 28, 2005; the prior application is herewith incorporated by reference in its entirety.

We claim:

1. A hydraulic circuit for cooling at least one clutch of a transmission of a motor vehicle, comprising:
   at least one hydraulic pump;
   at least one filter element for filtering hydraulic oil communicating with said at least one hydraulic pump;
   at least one pressure-regulating valve communicating with said hydraulic pump;
   at least one adjusting valve disposed to control a volume flow of cooling oil flowing to the clutch; and
   a pressure-compensation valve;
   wherein at least one of said pressure-regulating valve, said adjusting valve, and said pressure-compensation valve are configured within the hydraulic circuit to maintain a substantially constant pressure difference between a supply pressure and a resulting cooling-oil pressure.

2. The hydraulic circuit according to claim 1, wherein said adjusting valve is configured to meter a volume flow of cooling oil, and said adjusting valve is formed with an orifice plate.

3. The hydraulic circuit according to claim 1, wherein said adjusting valve is configured as a slotted slide.

4. The hydraulic circuit according to claim 1, wherein said filter element is a pressure filter disposed downstream of said hydraulic pump in a fluid flow direction.

5. The hydraulic circuit according to claim 1, wherein said adjusting valve is formed with a first inlet, and said pressure-regulating valve is connected downstream of said pressure filter in a fluid flow direction, and said pressure-regulating valve is fluidically connected, directly or indirectly, to said first inlet of said adjusting valve.

6. The hydraulic circuit according to claim 1, which comprises additional components connected in the hydraulic circuit, including further pressure valves and/or control valves.

7. The hydraulic circuit according to claim 1, wherein said adjusting valve has a first outlet fluidically connected to the clutch to be cooled.

8. The hydraulic circuit according to claim 7, wherein said first outlet of said adjusting valve is additionally fluidically connected to said pressure-compensation valve.

9. The hydraulic circuit according to claim 1, which comprises a further pressure line communicating with said pressure-regulating valve, and wherein said pressure-compensation valve is fluidically connected to an outlet line and to said pressure-regulating valve via said further pressure line.

10. The hydraulic circuit according to claim 9, wherein said pressure line is flow-connected to a second inlet of said adjusting valve.

11. The hydraulic circuit according to claim 9, which comprises an oil cooler connected in said pressure line.

12. The hydraulic circuit according to claim 1, wherein said adjusting valve is one of two adjusting valves for two clutches of a twin-clutch transmission.

13. The hydraulic circuit according to claim 12, which comprises a maximum former connected between said adjusting valves and said pressure-compensation valve.

14. The hydraulic circuit according to claim 1, wherein said adjusting valve is a slotted slide having at least one specifically configured piston element displaceably mounted against a spring force.

15. The hydraulic circuit according to claim 1 configured for a twin-clutch transmission.

16. The hydraulic circuit according to claim 1 configured as a low-pressure circuit.

* * * * *